Jan. 15, 1952 A. ROSE 2,582,850
PHOTOCELL
Filed March 3, 1949 2 SHEETS—SHEET 2
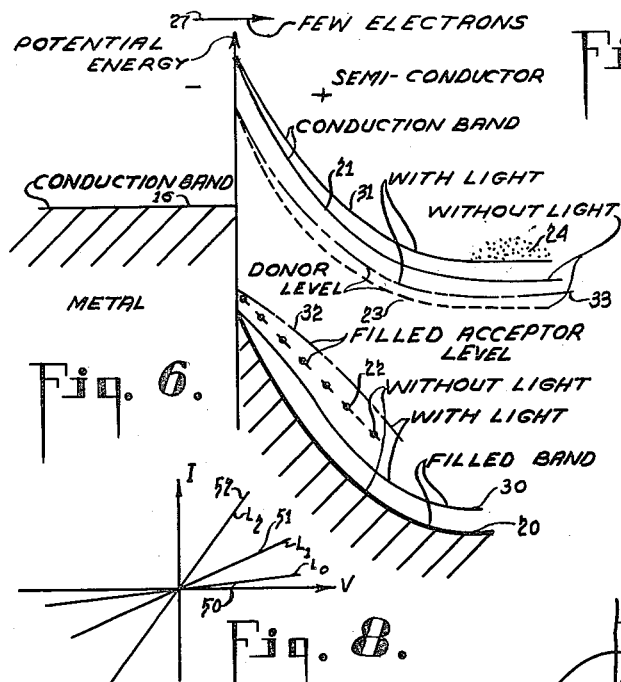
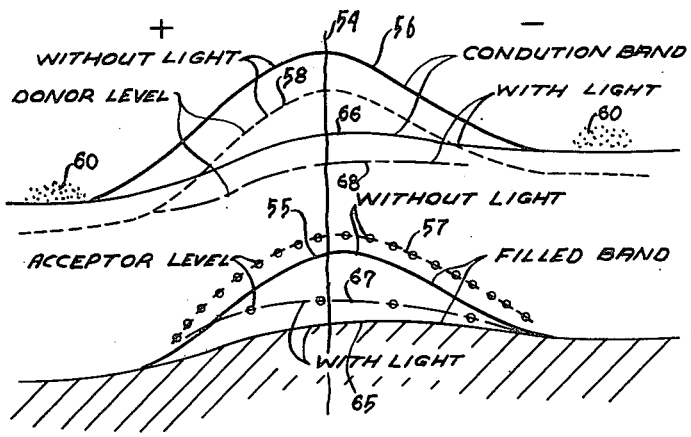
INVENTOR
ALBERT ROSE Patented Jan. 15, 1952

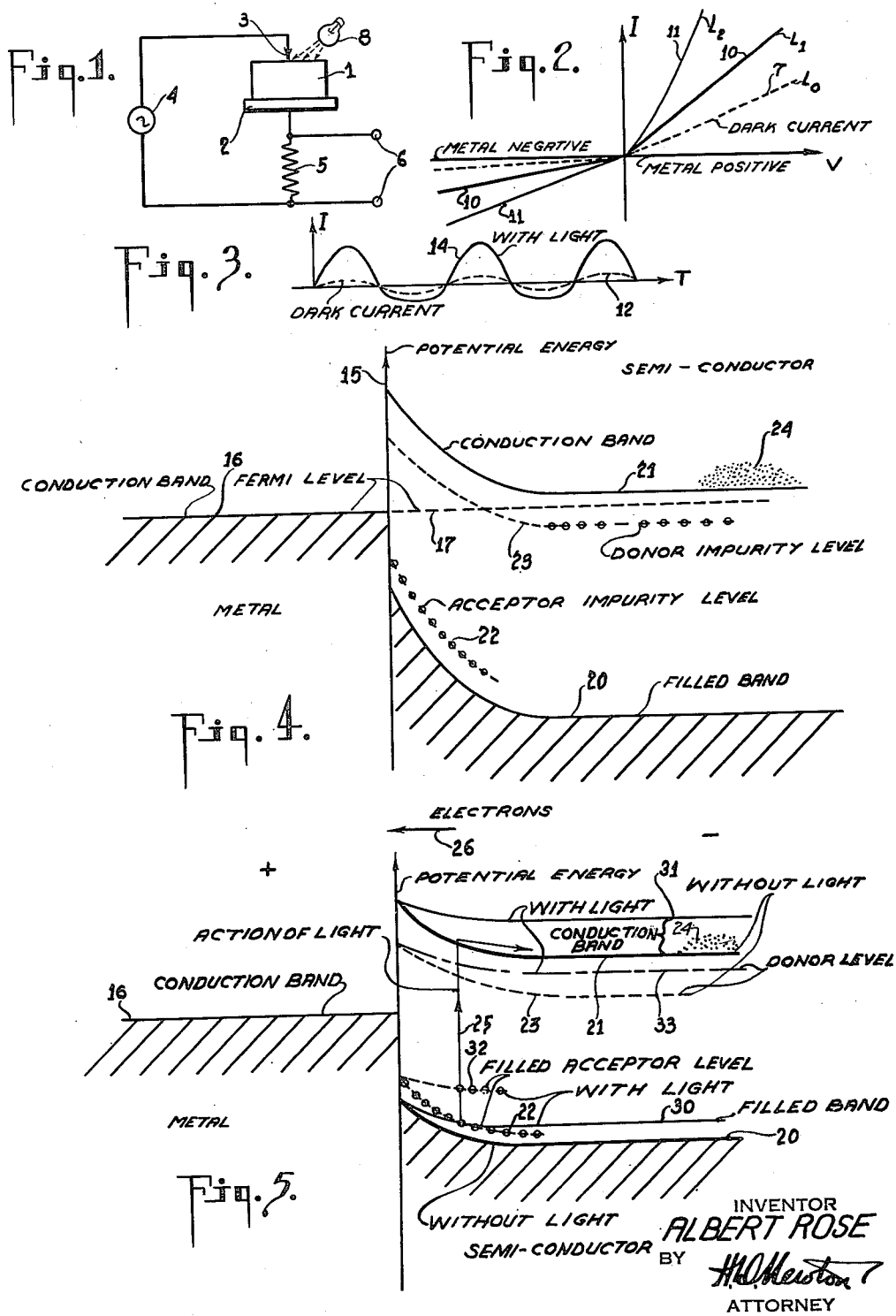

2,582,850

UNITED STATES PATENT OFFICE 2,582,850

PHOTOCELL

Albert Rose, Princeton, N. J., assignor to Radio Corporation of America, a corporation of Delaware Application March 3, 1949, Serial No. 79,348

10 Claims. (Cl. 201—63)

This invention relates to photocells and more particularly to photo-conductive cells wherein light causes the flow of current through the material of the cell under the influence of an electric field.

It is well known that photocells may be divided into two classes, one type of photocell being a photo-conductive cell to which the present invention pertains. The other type of photocell is provided with a material having photo-electric emmission whereby photo-electrons are liberated by the action of light from the surface of the material and may be withdrawn by an electric field through an evacuated space. It will be quite evident that a photo-electric cell normally cannot have a current in the absence of light because in that case no photo-electrons are liberated. On the other hand, the light sensitivity of a photo-electric cell is generally smaller than that of a photo-conductive cell. However, photo-conductive cells have the drawback that usually the "dark" current is comparatively high, the dark current being the current present in the absence of light. It is therefore desirable to provide a photo-conductive cell which combines high sensitivity with a low dark current.

In some cases it may be desirable to provide a photocell which will rectify an impressed alternating current. It is frequently more convenient to utilize an alternating current source in combination with a photocell rather than a direct current source. Thus, a photocell which inherently functions as a rectifier will simplify the requirements for its electric power source.

It is an object of the present invention, therefore, to provide an improved and compact photo-conductive cell.

Another object of the invention is to provide an improved photo-conductive cell adapted to operate with a source of alternating current connected across its electrodes and to provide a rectified output voltage in response to light falling on the cell.

A further object of the invention is to provide a photo-conductive cell which may produce a very small dark current and which has a very high light sensitivity, the quantum efficiency being appreciately above 100 per cent.

A photo-conductive cell in accordance with the present invention comprises a body of cadmium sulphide provided with two metallic electrodes. One of the electrodes has a large area contact with the cadmium sulphide body while the other electrode has a contact area with the body which is small compared to that of the first electrode. A source of alternating current and a load impedance element may be connected serially between the electrodes of the cell. A rectified voltage will be developed across the load impedance element in response to light impinging on or near the contact area between the cadmium sulphide body and the small area electrode. While this type of photocell is described in detail in this application it is not claimed herein but rather in my copending application Serial No. 226,407 which was filed on May 15, 1951, as a division hereover.

A photo-conductive cell which combines a low dark current with a high light sensitivity may consist in accordance with the present invention of two or more bodies of cadmium sulphide which contact each other and which are provided with two electrodes across which a source of potential and a load impedance element may be connected. In view of the symmetry of this photo-conductive cell, the cell will not rectify. The bodies of such a photo-conductive cell consist of the same semi-conducting material containing donor impurities in their interior and acceptor impurities on their surfaces. The effect of the donor impurities is to provide a high volume conductivity while the acceptor impurities in combination with the donor impurities will normally make the surfaces electric insulators. Light falling on the contacting surfaces of the semi-conducting bodies will break down the insulating potential barrier between the bodies to permit flow of current in excess of that due to the liberation of photo-electrons by the light. This action will be explained in more detail hereinafter.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Fig. 1 is a schematic circuit diagram of a rectifying photo-conductive cell in accordance with the present invention;

Fig. 2 is a graph illustrating a family of curves showing the current-voltage characteristics of the cell of Fig. 1;

Fig. 3 is a graph showing the current variation with time developed in a load impedance element of the circuit of Fig. 1 in the presence or absence of light;

Figs. 4 to 6 illustrate potential energy curves showing the energy levels at a boundary of the photocell of Fig. 1, Fig. 4 illustrating the thermal equilibrium state, Fig. 5, illustrating the conditions existing when a potential is applied across the electrodes of the cell and Fig. 6 illustrating the conditions when the potential is reversed;

Fig. 7 is a schematic circuit diagram of another photo-conductive cell in accordance with the present invention;

Fig. 8 is a graph showing a family of curves indicating the voltage-current characteristics of the cell of Fig. 7; and Figs. 9 and 10 are graphs illustrating potential energy curves or energy levels at a boundary of the cell of Fig. 7, Fig. 9 showing the thermal equilibrium state and Fig. 10 showing the conditions when an electric field is applied across the electrodes of the cell.

Referring now to Fig. 1 of the drawings, there is illustrated a photo-conductive cell in accordance with the present invention including a crystalline body 1 of cadmium sulphide which is a semi-conductor. A large area metallic electrode 2 is in contact with cadmium sulphide body 1 and a small area or point-contact electrode 3 is also in contact with the cadmium sulphide body 1. A source of potential such as alternating-current source 4 may be connected in series with load impedance element 5 which may be a resistor, as shown, between electrodes 2 and 3. Electrodes 2 and 3 may consist of a suitable metal such, for example, as nickel, copper or tungsten. Electrode 3 preferably consists of a metallic wire which may have a point having a diameter of a few mils. An output voltage developed across load resistor 5 may be obtained from output terminals 6.

In the absence of light a dark current will flow through load resistor 5. Let it be assumed that potential source 4 develops a unidirectional potential. This unidirectional dark current developed in this case is shown by curve 7 of Fig. 2 marked $L_0$ and plotted with respect to the voltage applied to point electrode 3. It will be observed that the current is comparatively small as long as electrode 3 is negative but that the current increases when electrode 3 becomes positive. If light developed by light source 8 impinges on or near the contact area between point electrode 3 and cadmium sulphide body 1, the current flowing through load resistor 5 is increased as shown by curves 10 and 11 of Fig. 2. Curve 10 marked $L_1$ corresponds to a small amount of light falling on cadmium sulphide body 1 while curve 11 marked $L_2$ corresponds to a larger amount of light falling on body 1. The current is not necessarily linear with voltage as indicated by curve 11 of Fig. 2.

The photo-conductive cell of Fig. 1 is sensitive within the visible spectrum, and the light sensitivity is considerably in excess of 100 per cent quantum efficiency. In other words, for each photo-electron liberated by light in body 1 more than one electron becomes available to carry the current. This will be explained more in detail hereinafter in connection with Figs. 4 to 6.

Fig. 3 illustrates the variation with time of the current flowing through load resistor 5 when source 4 is an alternating-current source as shown in Fig. 1. Thus, curve 12 illustrates the dark current, that is, the current in the absence of light. Curve 14 illustrates the current in the presence of light. It will be seen that the current is substantially rectified, that is, current will substantially only flow in one direction.

It may be mentioned that the surface of cadmium sulphide body 1 need not be treated. However, it has been found that oxidation of the surface will raise the resistance of body 1 in the forward direction while etching of the surface will lower the resistance in the forward direction.

Figs. 4 to 6 illustrate the potential energy levels existing under different conditions near the boundary between metal electrode 3 and cadmium sulphide body 1 which is a crystalline semi-conductor. Fig. 4 illustrates the energy level for the thermal equilibrium state, that is, when metal electrode 3 contacts cadmium sulphide body 1, without, however, applying an external electric potential. Vertical line 15 represents the boundary line between metal and semi-conductor. At the same time line 15 is the ordinate indicating potential energy while the abscissa represents the distance from the boundary line. Accordingly, the distance to the left and right of line 15 or along an abscissa indicates a certain depth from the boundary line into either the metal or the semi-conductor respectively. The potential energy increases in the direction shown by the arrow of line 15. In the metal the Fermi level or conduction band is indicated by horizontal line 16 in accordance with the accepted theory of metals. At temperatures approaching absolute zero, the levels below line 16 are filled by electrons. At any finite temperature some electrons are thermally excited above line 16, leaving a corresponding number of vacant levels below line 16. When an external field is applied (at any temperature) the symmetry of the distribution of electrons is altered so that a current flows.

The Fermi level is indicated by horizontal lines 16 and 17, line 17 extending into the semi-conductor. The Fermi level may be defined to a good approximation as the highest energy level occupied by electrons at absolute zero temperature. The Fermi energy $E_0$ corresponding to the Fermi level may be expressed as the following function:

$$f(E) = \frac{1}{1 + e\left(\frac{E-E_0}{kT}\right)}$$

where $E$ is the energy, $k$ Boltzmann's constant and $T$ the absolute temperature. Further information on the Fermi-Dirac statistics from which the Fermi level may be derived is contained, for example, in the book by A. H. Wilson entitled "The Theory of Metals" published in Cambridge, Great Britain, at the University Press, 1936 (see in particular page 16 and page 255 and seq.).

The filled band in the semi-conductor exists below curve 20 while the conduction band is represented above curve 21. Only electrons above curve 21 are free to move. Such a semi-conductor will normally and at very low temperatures behave like an insulator. The electrons in the filled band 20 are not free to move and no electrons are permitted between the filled band 20 and the conduction band 21. The energy gap between the two bands is normally too high to be bridged by a thermally excited electron. However, it must be assumed that cadmium sulphide body 1 contains donor impurities in its interior and acceptor impurities on its surface or close to the surface.

It is usually assumed that the free electrons which account for the conduction of current in a semi-conductor are donated by impurities or lattice imperfections which may be termed "donors." A donor may, for example, have one more valence electron than the atoms which make up the bulk of the semi-conductor. The excess valence electron is therefore free to move when thermally excited into the conduction band. It is also known that in certain semi-conductors which are of the P type, current conduction appears to take place as if the carriers were positive charges. This is believed to be due to the presence of another type of impurity which will accept an electron from an atom of the semi-conductor. Such an "acceptor" may have one valence electron less than the atoms of the bulk of the semi-conductor. In this case, current conduction takes place by a "hole" in the crystalline structure which might be considered a virtual positive charge. Under the influence of an external electrical field a hole will travel in the direction that a positive charge will travel.

Returning now to Fig. 4 curve 22 indicates the acceptor impurity levels, the points on the dotted line indicating electrons of the acceptor. The acceptor levels are above the filled band. The donor impurity levels are shown by dotted curve 23 and the points on the curve again indicate electrons. The donor levels are just below the conduction band. It will be observed that the donor atoms above Fermi level 17 have substantially lost their electrons which have been shown with other free electrons as cloud 24 above conduction band 21. In other words, thermal excitation will supply the relatively free electrons of the donor atoms above Fermi level 17 with sufficient energy to move them into the conduction band. It will be noticed that conduction band 21 slopes up toward boundary line 15 to such an extent that normally electrons will be unable to penetrate the potential barrier and to move from the semi-conductor into the metal. Furthermore, the free electrons of the metal will also be unable to penetrate the steep potential barrier into the semi-conductor.

It may be pointed out that it is believed that free cadmium is the donor impurity in the bulk of a cadmium sulphide semi-conductor. It is furthermore believed that oxygen which may form even at room temperature on the surface of a cadmium sulphide crystal will function as the acceptor impurity shown in the curves of Fig. 4.

Let it now be assumed that such a potential is applied between point electrode 3 and cadmium sulphide body 1 that the metal becomes positive and the semi-conductor negative as illustrated in Fig. 5. The conduction band 16 of the metal remains in the same position. However, the slopes of the filled band 20 and of the conduction band 21 in Fig. 5 are considerably reduced so that the potential barrier between the interior of the semi-conductor and the boundary is correspondingly reduced. The same applies to the filled acceptor levels 22 and the donor levels 23, as shown in Fig. 5.

When light falls on the boundary line between the semi-conductor and the metal, photoelectrons are liberated. Such a photoelectron, for example, may be liberated from an acceptor atom as indicated by arrow 25. The electron is lifted above the level of conduction band 21 so that the electron is now free to join electron cloud 24. This will leave a "hole" in the acceptor impurity from which the electron has been separated. This hole may have a lifetime of the order of a few milliseconds. The life of the hole may be terminated by recombination with an electron. At the same time the electron dipole moment formed by the dissociated electron and the acceptor hole counteract to a certain extent the potential barrier set up by the metal-semi-conductor contact. Accordingly, after a certain time during which the boundary has been illuminated the filled band now occupies level 30, the conduction band follows curve 31, the acceptor levels is shown by curve 32 and the donor levels by curve 33. It will now be seen that a comparatively small thermal energy will be sufficient to lift the electron cloud indicated at 24 across the potential barrier and into the metal. If the dipole moment represented by a free electron and a free hole remains unneutralized for a sufficient length of time to permit more than one electron to cross the barrier from semi-conductor to metal, an actual electron gain or current multiplication is obtained. This gain may be as high as 1,000 fold or more. In other words for each photoelectron 1,000 or more electrons are permitted to cross the potential barrier from the semi-conductor to the metal. This flow of electrons is indicated in Fig. 5 by arrow 26.

Fig. 6 illustrates the potential energy curves for a reversed potential where the metal is negative and the semi-conductor is positive. Curves 20 to 23 again indicate the filled band, conduction band, acceptor levels and donor levels, respectively. The applied external potential causes the slopes of the energy levels to become steeper as clearly shown in Fig. 6 so that the potential barrier between the semi-conductor and the metal increases considerably. The light will again have the same effect as previously described and accordingly the slopes of the energy levels are slightly reduced as illustrated by curves 30 to 33. The free holes will travel into the metal. Under the influence of the applied electric field a few electrons will be able to move from the metal to the semi-conductor as indicated by arrow 27 by overcoming the rather high potential barrier between the two materials. The curves of Fig. 6 accordingly explain why the photo-conductive cell of Fig. 1 also functions as a rectifier.

The sensitivity of the cell of Fig. 1 is of the order of one milliampere per lumen. It will be quite obvious that the photo-conductive cell of Fig. 1 is also responsive to electron bombardment or to X-rays.

Referring now to Fig. 7 there is illustrated another photo-conductive cell in accordance with the invention which, however, will not rectify an applied alternating current. The photo-conductive cell consists of two bodies 40 and 41 of the same semi-conducting material which are in contact with each other. The semi-conducting material of bodies 40 and 41 may, for example, consist of cadmium sulphide although other semi-conducting materials could be used which will satisfy the conditions which will be explained in connection with Figs. 9 and 10. Light developed by light source 42 may be made to fall on or near the common surfaces of the two bodies 40 and 41. Metallic electrodes 43 and 44 form a large area contact with each of the bodies 40 and 41. A source of power such as battery 45 is connected in series with load resistor 46 across electrodes 43, 44 and an output voltage developed across resistor 46 may be derived from output terminals 47.

Bodies 40 and 41 should have donor impurities in their interiors so that the volume conductivity of the bodies is high. After the donor impurities have been introduced into the bodies, acceptor impurities are introduced on the surfaces of the bodes so that the surfaces are normally electric insulators. Light falling on the contacting surfaces of bodies 40, 41 will then break down the insulating potential barrier between the bodies and will permit a flow of current in excess of that due to the liberation of photoelectrons by the light. As stated hereinabove, if the bodies consist of cadmium sulphide, it is believed that excess cadmium in the interior of the bodies will function as the donor impurities while an oxide layer on the surface will probably function as the acceptor impurities on the surfaces of the bodies.

Curve 50 of Fig. 8 (marked $L_0$) illustrates the dark current through the photo-conductive cell in dependence upon the applied voltage. It will be observed that the dark current is extremely small and is symmetrical with respect to the sign of the voltage. Curves 51 and 52 of Fig. 8 (marked $L_1$ and $L_2$ respectively) indicate the current in the presence of a smaller amount and of a larger amount of light respectively. The light sensitivity is very high and may be of the order of one milliampere per lumen.

Figs. 9 and 10 to which reference is now made, illustrate the potential energy levels near the boundary line between bodies 40 and 41, the boundary line being indicated at 54. Curve 55 indicates the filled band and curve 56 the conduction band in both semi-conductors. The acceptor levels are shown at 57 and the donor levels at 58. It will be observed that the acceptor levels exist only near the boundary line and that the donor impurities adjacent the boundary line have lost their electrons which are again indicated by a dot. Electron clouds indicated at 60, 60 may exist above the conduction band 56.

When a positive potential is applied to the semi-conductor to the left of boundary 54 and a negative potential is applied to the semi-conductor to the right of boundary line 54, filled band 55, conduction band 56, acceptor levels 57, and donor levels 58 are distorted as illustrated in Fig. 10. Let it now be assumed that light falls on or near boundary line 54. In that case, an electron is liberated from an acceptor impurity 57 and lifted above conduction band 56. This will again leave a hole in the acceptor impurity in the manner previously described. The action of the positive charge represented by the hole is to reduce the potential hump. Thus, the light again dissociates an electron and an acceptor hole to set up an electric dipole moment which reduces the potential barrier during the lifetime of the dipole. The filled band, the conduction band, the acceptor levels and the donor levels are now illustrated by curves 65, 66, 67 and 68, respectively. It will be seen that the potential barrier of the conduction band previously existing near the boundary line 54 has been reduced to such an extent that electrons such as the electrons represented by clouds 60 may readily flow under the influence of the applied electric field across the boundary barrier. Thus, a large number of electrons is free to move when light falls on the boundary between the two semi-conductors. In the absence of light very few electrons will be able to cross the potential barrier which explains the low dark current which has been observed.

It will be appreciated that more than two semi-conductor bodies may be arranged in series or in parallel to form an extending area photocell.

There has thus been disclosed a photo-conductive cell which will rectify an applied alternating current. There has further been disclosed a photo-conductive cell having a very small dark current and a very high light sensitivity, the current being of the order of 1,000 times or more of the primary photo current. A photo-conductive cell of the latter type may consist of cadmium sulphide or of any semi-conducting material which behaves as shown by the curves of Figs. 9 and 10. In particular, the semi-conducting material should have donor impurities in the interior of the material and acceptor impurities on its surface.

What is claimed is:

1. A photo-conductive cell comprising a first and a second body of cadmium sulphide, said bodies contacting each other, and two metallic electrodes, each being in contact with one of said bodies.

2. A photo-conductive cell comprising at least two bodies of cadmium sulphide contacting each other, two metallic electrodes, each being in contact with a different one of said bodies.

3. A current valve comprising a first and a second body in contact with each other, said bodies consisting of the same semi-conducting material, and two metallic electrodes, each being in contact with one of said bodies, said bodies of semi-conducting material containing donor impurities in their interior and acceptor impurities on their surfaces.

4. A photo-conductive cell comprising a first and a second body in contact with each other, said bodies consisting of the same semi-conducting material, two metallic electrodes, each being in contact with one of said bodies, said bodies containing donor impurities in their interior so that the volume conductivity is high, said bodies containing acceptor impurities on their surfaces so that said surfaces are normally electric insulators, whereby light falling on the contacting surfaces of said bodies will break down the insulating potential barrier between said bodies and will permit a flow of current in excess of that due to the liberation of photo-electrons by said light.

5. A photo-conductive cell comprising a first and a second body in contact with each other, said bodies consisting of the same semi-conducting material, two metallic electrodes, each being in contact with one of said bodies, said bodies of semi-conducting material containing donor impurities in their interior and acceptor impurities on their surfaces, a source of potential and a load impedance element connected serially between said electrodes, whereby light falling on the contacting surfaces of said bodies will increase the flow of current through said element in excess of that caused by the liberation of photo-electrons by said light.

6. A photo-conductive cell comprising at least two bodies in contact with each other, said bodies consisting of the same semi-conducting material, and two metallic electrodes each being in contact with a different one of said bodies, said bodies of semi-conducting material containing donor impurities in their interior and acceptor impurities on their surfaces, whereby light falling on the contacting surfaces of said bodies will appreciably increase the flow of current caused by applying a potential across said electrodes.

7. A photo-conductive cell, comprising a plurality of cadmium sulphide bodies in contacting relation, and two spaced apart metallic electrodes in contact with said bodies.

8. A photo-conductive cell, comprising a plurality of bodies in contact with one another, said bodies consisting of substantially the same semi-conducting material, and two spaced metallic electrodes each being in contact with at least one of said bodies.

9. A photo-conductive cell, comprising at least two semi-conducting bodies in contacting relation, and two spaced apart metallic electrodes each being in contact with a different one of said bodies, said bodies containing donor impurities in their interior and acceptor impurities on their surfaces.

10. A current valve comprising two spaced-apart metallic electrodes, a connection of variable conductivity between said contacts including a quantity of semi-conductive material bridging a space therebetween, said quantity of material comprising two adjacent portions which individually abut against said contacts, donor impurities being contained in the interior of each of said portions and acceptor impurities being contained in a relatively restricted region of said material between said portions.

ALBERT ROSE.

REFERENCES CITED

The following references are of record in the file of this patent:

UNITED STATES PATENTS

| Number | Name | Date |
|---|---|---|
| 1,936,514 | Lengnick | Nov. 21, 1933 |
| 2,103,623 | Kott | Dec. 28, 1937 |

FOREIGN PATENTS

| Number | Country | Date |
|---|---|---|
| 314,838 | Great Britain | July 3, 1929 |

OTHER REFERENCES

Ramsay: Philosophic Magazine, vol. 12, 1906, page 411.

Hughes: Photoelectric Phenomena, 1932, page 372.